United States Patent [19]

Shu et al.

[11] 3,832,462

[45] *Aug. 27, 1974

[54] ANTIBIOTIC AV290-SYNTAN COMPLEXES AND ANIMAL FEED SUPPLEMENTS

[75] Inventors: Ping Shu, Pomona; Murray Dann, Pearl River, both of N.Y.

[73] Assignee: American Cyanamid Company, Stamford, Conn.

[ * ] Notice: The portion of the term of this patent subsequent to June 25, 1991, has been disclaimed.

[22] Filed: Apr. 11, 1972

[21] Appl. No.: 243,093

Related U.S. Application Data

[63] Continuation-in-part of Ser. No. 86,601, Nov. 3, 1970, abandoned.

[52] U.S. Cl.................. 424/123, 424/118, 424/124

[51] Int. Cl............................................. A61k 21/00
[58] Field of Search...................... 424/118, 123, 124

[56] References Cited
UNITED STATES PATENTS
3,338,786  8/1967  Kunstmann......................... 424/118

*Primary Examiner*—Jerome D. Goldberg
*Attorney, Agent, or Firm*—Edward A. Conroy, Jr.

[57] ABSTRACT

This disclosure describes a reversible complex of antibiotic AV290 with a synthetic tanning agent and a process for preparing same. The complex is useful as an animal feed supplement which significantly enhances the growth rate of animals and poultry.

5 Claims, No Drawings

ANTIBIOTIC AV290-SYNTAN COMPLEXES AND ANIMAL FEED SUPPLEMENTS

CROSS REFERENCE TO RELATED APPLICATION

This application is a continuation-in-part of our co-pending application Ser. No. 86,601, filed Nov. 3, 1970, now abandoned.

BRIEF SUMMARY OF THE INVENTION

This invention relates to a method of recovering antibiotic AV290 from fermentation whole harvest mashes containing it. More particularly, the process involves adding a synthetic tanning agent either to the whole harvest mash or to the filtered fermentation liquor, and recovering the so precipitated antibiotic-syntan reversible complex by any convenient means. The invention also relates to the use of the so prepared complex in animal feed supplement compositions for enhancing the growth rate of animals such as poultry, swine, early weaned pigs, and ruminants such as cattle, sheep and goats.

DETAILED DESCRIPTION OF THE INVENTION

Antibiotic AV290 is formed by fermentative biosynthesis during the cultivation under controlled conditions of *Streptomyces candidus* NRRL 3218 and mutants thereof. The preparation and properties of antibiotic AV290 are set forth in U.S. Pat. No. 3,338,786 which is hereby incorporated by reference. The problem of recovering the antibiotic economically has been a serious one. In the patent referred to above, adsorption on charcoal followed by elution and column chromatography are employed. Such a process is not excessively expensive where pure antibiotic is required for medical usage. However, when the antibiotic is to be used in animal feed supplement compositions the factor of cost is a very serious matter and there is, therefore, a need for an inexpensive process of recovering the antibiotic for this purpose.

The present invention deals with a process and in a more specific aspect also with a product. The process involves the precipitation of the antibiotic either from the whole harvest mash or from the filtered fermentation broth by the addition of a synthetic tanning agent. The synthetic tanning agent operable in the novel process of the present invention is a sulfited phenol formaldehyde condensate which may be represented by the following general formula:

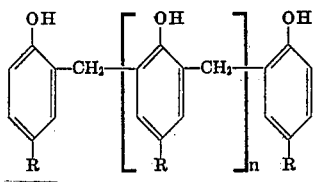

wherein R is hydrogen or a methylene sulfonic acid group ($-CH_2SO_3H$) and $n$ is 0,1,2,3, or 4 with the proviso that about half of the R groups present are methylene sulfonic acid groups. This synthetic tanning agent is not a pure chemical compound but of necessity is obtained as a mixture having an estimated molecular weight of 420–530. It is readily prepared by first condensing phenol and formaldehyde in aqueous media followed by reaction of the intermediate condensate with formaldehyde, various sulfites, and buffer acids thus forming ω-sulfonic acid groups ($-CH_2SO_3H$) in the molecule. The product is an amorphous water-soluble material that may be obtained either in concentrated water solution or in powder form, and ranges from colorless to dark brown. In order to avoid cumbersome language, this synthetic tanning agent will be referred to by its generic name in the art as "syntan", and this term will be used extensively in the specification and appended claims. A sulfited phenol formaldehyde syntan of the above general type is sold by A. J. & J. O. Pilar Inc. of Newark, N.J. under the trade Tru-Tan RT Regular.

The novel process of the present invention provides almost complete removal of the antibiotic activity from the fermentation mash or broth. Furthermore, the antibiotic-syntan complex so obtained can be used without separation of the constituents in animal feed supplement compositions, which is an important economic advantage. Therefore, in one of the aspects of the present invention the complex of antibiotic AV290 and the above-described syntan is included as a new product.

The product of the antibiotic and the syntan has been referred to as a reversible antibiotic-syntan complex. Its exact chemical nature has not been determined, but covalent bonding is not involved and the product is not a physical mixture. This complex, derived from the interaction of the antibiotic and the syntan, is not necessarily combined in any limiting stoichiometry. The chemical bonds are reversible since antibiotic AV290 may be recovered from the complex by adsorption on a cross-linked carboxymethyldextran gel column followed by elution with aqueous acid. While it is not intended to limit the present invention to theories of chemical constitution and the like, it seems probable that the complex of the present invention is sufficiently reversible so that under conditions of use in animal feed supplement compositions the antibiotic is set free upon ingestion.

As starting material for the novel process of the present invention there may be employed the whole harvest mash obtained after completion of a fermentation with *S. candidus* NRRL 3218 or mutants thereof. Preferably, there is employed the fermentation liquor or broth which has been clarified by removing the mycelia and other insolubles by filtration. Diatomaceous earth or any other conventional filtration aid may be used to assist in the filtration. In either case, the pH of the whole mash or the filtered broth is first adjusted to between 1.4 and 5.0 with dilute aqueous acid. Suitable acids for this purpose may be, for example, dilute hydrochloric acid, dilute sulfuric acid, dilute trifluoroacetic acid, etc., although even glacial acetic acid may be used. Then an aqueous solution of the syntan is added slowly, with stirring, at ambient temperatures. The antibiotic and the syntan form a complex which is water insoluble and thus precipitates. The precipitated syntan complex or, in the case of the whole mash, the precipitated syntan complex together with the fermentation mash solids, is then removed by filtration or centrifugation and dried. The products so obtained may be dried by (1) slurrying the wet solids in polar, water miscible non-solvents such as acetone followed by filtration, rinsing and air-drying; or by (2) reslurrying the wet solids in water and freeze drying or spray drying.

When the products of the present invention are thus carefully dried under temperature conditions which do not degrade antibiotic AV290, they are usually white to tan powders in the case of the syntan complex. In the case of the syntan complex associated with dried harvest mash solids, they are usually gray to brown powders or solids. In the dry form, these products are extremely stable, keeping without significant loss of antibiotic activity for considerable periods of time. This long storage life is, of course, an important practical advantage.

It is an advantage of the present invention that the amount of syntan added to precipitate the complex with the antibiotic is not critical and no exact stoichiometric relations need be followed. In general, the amount of syntan used will be somewhat in excess of the minimum required to form the complex with the antibiotic. Excess syntan will merely remain in solution upon filtration. The amount of syntan required is, however directly proportional to the antibiotic concentration in the mash or liquor. The specific bioactivity of the precipitated complex also varies and it is in fact likely that the complex has varying relative amounts of antibiotic and, of course, is quite likely to be a mixture of complexes because the syntan used is not a pure single chemical compound.

The minimum amount of syntan required to form the complex with the antibiotic in any particular fermentation batch may be readily determined as follows. A sample (conveniently 50–100 ml.) of the fermentation whole harvest mash is taken and clarified by removing the mycelia and other insolubles by filtration, preferably with a filter aid. The filtrate is then acidified to a pH of 1.8–2.0 with dilute aqueous mineral acid such as dilute hydrochloric acid, dilute sulfuric acid, dilute phosphoric acid, or the like. This solution is then titrated with the particular aqueous solution of syntan which is to be used until no further precipitate or turbidity forms. The amount of syntan solution for the fermentation batch is then calculated from the titer of the sample taken, providing also for a slight excess.

This invention also relates to animal feed supplement compositions effective in accelerating the growth rate of animals and poultry. In recent years the use of antibiotics in animal feeds for improving growth characteristics and efficiency of feed utilization has become of considerable economic importance. In accordance with the present invention, the dried syntan complex or the dried harvest mash solids containing the syntan complex, either alone or in combination with suitable carriers, when added to an animal feed aid in increasing the growth rate. In addition, feed efficiency is improved. The present invention has the advantage that the growth rate of non-ruminants such as poultry and swine and especially weanling pigs is significantly increased, and that feed conversion rates are noticeably enhanced.

The feed supplement compositions of the present invention are administered in an amount sufficient to furnish approximately the following dosage levels in mg./head/day:

| | |
|---|---|
| Large ruminants | 350 |
| Small ruminants | 200 |
| Non-ruminants | 100 |
| Poultry | 2 |

The milligrams per pound of antibiotic AV290 present in any particular supplement composition of the present invention may be readily determined by bioassay (after adjusting the pH to 8.0–9.0) as set forth in U.S. Pat. No. 3,338,786. The preferred method is an adaptation of the *Staphylococus aureus* turbidimetric assay for tetracycline that is described in the manual "Assay Methods of Antibiotics, a Laboratory Manual" by D. C. Grove and W. A. Randall, Medical Encyclopedia Inc. (1955) pages 48–52. From the potency data thus obtained, the pounds of feed supplement composition to be used per ton of feed may be readily calculated.

A wide variety of carriers may be used in the preparation of the feed supplement compositions of this invention containing the dried syntan complex or the dried harvest mash solids containing the syntan complex. Carriers suitable for use to make up the feed supplement compositions include the following: soybean meal, alfalfa meal, cotton seed oil meal, linseed oil meal, cornmeal, cane molasses, urea, bone meal, corncob meal, and the like. The carrier promotes a uniform distribution of the complex in the finished feed into which the supplement is blended. It thus performs an important function by ensuring proper distribution of the complex throughout the feed.

For a clearer understanding of the invention, specific examples of it are set forth below. These examples are merely illustrative, and are not to be understood as limiting the scope and underlying principles of the invention in any way.

EXAMPLE 1

Preparation of antibiotic AV290-Tru-Tan RT Regular complex

Fourteen liters of *S. candidus* fermentation broth containing 722 mcg. of AV290 antibiotic per ml. was adjusted to pH 1.8 with sulfuric acid and then filtered with the aid of diatomaceous earth. A 100 ml. portion of equal parts of Tru-Tan RT Regular and water was added with stirring to 10 liters of the filtrate. The precipitate was allowed to settle and the supernatant was decanted. The precipitate was collected by centrifugation, washed twice with 250 ml. of water, suspended in about 1 liter of water and freeze dried. The dried product, 30.5 gms., assayed 28.3 percent antibiotic activity.

EXAMPLE 2

Preparation of antibiotic AV290–Tru-Tan RT Regular complex from whole mash (A) and from mash filtrate (B)

Part A

Three liters of an *S. candidus* fermentation broth containing 2,000 mcg. of AV290 antibiotic per ml. was adjusted to pH 1.9 with sulfuric acid. Fifteen ml. of Tru-Tan RT Regular was added to the stirred acidified mash. The mixture was centrifuged and the solids were washed twice with 350 ml. of water by slurrying, centrifuging and decanting. The antibiotic activity that remained in the mash supernatant was precipitated with an additional 20.8 ml. of Tru-Tan RT Regular. The washed solids from the latter step were pooled with the washed solids from the initial step, suspended in 1,000 ml. of water and freeze dried. The dried product, 77 gms., bioassayed 6.3 percent antibiotic activity.

Part B

Three liters of filtered S. candidus fermentation broth containing 2,000 mcg. of AV290 antibiotic per ml. was adjusted to pH 1.9 with sulfuric acid. Fifteen ml. of Tru-Tan RT Regular was added to the stirred acidified filtrate. The mixture was centrifuged and the solids washed twice with 200 ml. of water by slurrying, centrifuging and decanting. The antibiotic activity that remained in the filtrate supernatant was precipitated with an additional 13.6 ml. of Tru-Tan RT Regular. The washed solids from both steps were pooled, suspended in 500 ml. of water and freeze dried. The dried product, 4 gms., bioassayed 37.5 percent antibiotic activity.

Toxicity Study:

The product of Part A and B were tested for toxicity as follows: The drugs (AV290-syntan complex) were administered to Carworth Farms CF-1 female mice weighing 18–20 grams. The drug was orally administered in 0.2 percent agar at a dose level of 1024 milligrams per kilogram of body weight. All of the mice survived the 14-day test period.

EXAMPLE 3

Preparation of antibiotic AV290-Tru-Tan RT Regular complex from whole mash

A 37.5 liter pool of fermentation broth, containing 3660 mcg. of AV290 antibiotic per ml., was adjusted to pH 2 with sulfuric acid. A 1312.5 ml. portion of Tru-Tan RT Regular which had been diluted with 1312.5 ml. of water was added to the acidified broth with stirring. The mixture was stored at 4°C. overnight and then filtered with the aid of 800 grams of diatomaceous earth. After the filter cake was washed with 15 liters of water, the damp pad was dried in vacuo at about 40°C. The dried product, 1439 grams, assayed 9 percent antibiotic activity.

Day-old chicks in the number indicated were purchased from a commercial supplier. The chicks were housed in heated brooders and held in a chick room maintained at about 24°C. All chick groups were weighed at the start of the tests and on termination at 28 days. Feed and water were supplied ad libitum. The following basal diet was employed in all tests:

BASAL DIET

| Ingredient | gm./kg. |
| --- | --- |
| Ground yellow corn | 514 |
| Soybean oil meal (44%) | 300 |
| Corn gluten meal | 50 |
| Menhaden fish meal (60%) | 50 |
| Fat | 40 |
| Dehydrated alfalfa meal (17%) | 20 |
| Ground limestone | 5 |
| Dicalcium phosphate | 12 |
| Sodium chloride | 3 |
| Trace minerals* | 1 |
| Vitamin pre-mix** | 5 |

*(Trace minerals – manganese (6.0%); iodine (0.12%); iron (2.0%); copper (0.2%); cobalt (0.02%); zinc (2.0%); and calcium (25.5%).
**Vitamin pre-mix – per kilogram of feed, contains 125 mg. of butylated hydroxytoluene; 500 mg. DL-methionine; 3300 I.U. Vitamin A; 1100 I.U. Vitamin $D_3$; 2.2 I.U. Vitamin E; 11 mcg. Vitamin $B_{12}$; 4.4 mg. riboflavin; 27.5 mg. niacin; 8.8 mg. pantothenic acid; 500 mg. choline chloride; 1.43 mg. folic acid and 1.1 mg. menadione sodium bisulfite to 5 grams of ground yellow corn.

The results of the tests are summarized in Table I, below.

TABLE I

Growth and Feed Efficiency by Chicks Receiving Rations Containing AV290–Syntan Complex

| Feed Additive | Level* | Number Of Birds | 0–28 Day Gain (Gm) | Feed Gain | % Improvement Gain | F/G |
| --- | --- | --- | --- | --- | --- | --- |
| TEST 1 | | | | | | |
| None | | 12 | 298 | 2.57 | | |
| AV290-Tru-Tan RT Regular | 10 | 12 | 322 | 2.36 | 8.0 | 8.2 |
| TEST 2 | | | | | | |
| None | | 12 | 549 | 1.60 | | |
| AV290-Tru-Tan RT Regular | 10 | 12 | 604 | 1.52 | 7.5 | 5.3 |

*Level = ppm. AV290-Syntan Complex expressed as pure antibiotic.

EXAMPLE 4

Preparation of antibiotic AV290–Tru-Tan RT Regular complex from whole mash

A 1500 liter portion of fermentation broth containing 1940 mcg. of AV290 antibiotic per ml. was adjusted to pH 2 with sulfuric acid. A 52.5 liter portion of Tru-Tan RT Regular which had been diluted with 52.5 liters of water was added to the acidified broth with stirring. The mixture was filtered with the aid of 45 kg. of diatomaceous earth and the cake was washed with water. The damp cake was dried in vacuo at about 55°C. The dry product, 93 kg., assayed 3.15 percent antibiotic activity.

EXAMPLE 5

Growth promoting effect of antibiotic AV290-Tru-Tan RT Regular complex combined with whole mash solids The efficacy of the feed supplement prepared according to Example 2 (A) was determined as follows:

We claim:

1. A process of recovering an antibiotic AV290-syntan complex from a fermentation whole harvest mash containing antibiotic AV290 which comprises the steps of:

a. producing a fermentation liquor by filtering the whole harvest mash;

b. acidifying the fermentation liquor to a pH of from 1.4 to 5.0 with a pharmacologically acceptable acid;

c. adding to the acidified liquor a syntan complexing agent comprising a mixture of compounds of the formula:

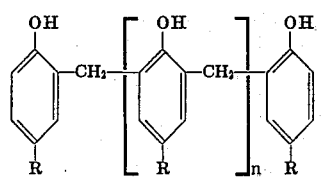

wherein R is hydrogen or methylene sulfonic acid and n is 0, 1, 2, 3, or 4 with the proviso that about half of the R's present are methylene sulfonic acid, until a sufficient amount of the antibiotic AV290-syntan complex is imparted to said medium;
  d. removing the precipitated antibiotic AV290-syntan complex; and
  e. drying the antibiotic AV290-syntan complex.

2. A dry complex of a syntan with antibiotic AV290 prepared in accordance with the process of claim 1.

3. A process for the production of a dried fermentation harvest mash solids animal feed supplement containing an antibiotic AV290-syntan complex which comprises the steps of:
  a. acidifying a fermentation whole harvest mash containing antibiotic AV290 to a pH of from 1.4 to 5.0 with a pharmacologically acceptable acid;
  b. adding to the acidified mash a syntan complexing agent comprising a mixture of compounds of the formula:

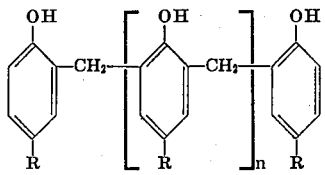

wherein R is hydrogen or methylene sulfonic acid and n is 0, 1, 2, 3, or 4 with the proviso that about half of the R's present are methylene sulfonic acid, until a sufficient amount of the antibiotic AV290-syntan complex is imparted to said medium;

c. removing the harvest mash solids together with the precipitated antibiotic AV290-syntan complex; and d. drying the mixture of mash solids and antibiotic AV290-syntan complex.

4. An animal feed supplement of a dry mixture of fermentation harvest mash solids and antibiotic AV290-syntan complex prepared in accordance with the process of claim 3.

5. An animal feed composition which comprises a nutritionally balanced animal feed and an effective amount for accelerating the growth rate of animals of antibiotic AV290-syntan complex prepared in accordance with the process of claim 1.

* * * * *